United States Patent
Simone

(10) Patent No.: US 6,688,874 B1
(45) Date of Patent: Feb. 10, 2004

(54) NON-CONTACT EXTRUSION NOZZLE HEAD FOR APPLYING SEALANT MATERIAL IN AN INSULATED GLASS ASSEMBLY

(76) Inventor: Albert A. Simone, 8 Reinhart Way, Bridgewater, NJ (US) 08807

( * ) Notice: Subject to any disclaimer, the term of this patent is extended or adjusted under 35 U.S.C. 154(b) by 0 days.

(21) Appl. No.: 09/298,366

(22) Filed: Apr. 23, 1999

(51) Int. Cl.⁷ .............................................. B29C 47/12
(52) U.S. Cl. ........................ 425/461; 425/113; 156/500
(58) Field of Search .............................. 156/500, 356, 156/578, 109; 425/113, 114, 117, 461, 464, 218

(56) References Cited

U.S. PATENT DOCUMENTS

| | | | |
|---|---|---|---|
| 2,013,688 A | * | 9/1935 | Kinsella ..................... 425/464 |
| 3,667,886 A | * | 6/1972 | Gauthier et al. ............ 425/192 |
| 4,084,930 A | * | 4/1978 | Neveu et al. ............... 425/198 |
| 5,556,471 A | * | 9/1996 | Boccagno et al. .......... 118/300 |

* cited by examiner

*Primary Examiner*—Richard Crispino

(57) ABSTRACT

A non-contact extrusion nozzle head for applying sealant material to a U-shaped receiving channel defined by two panes of glass and a spacer frame for forming an insulated glass assembly. The non-contact extrusion nozzle head includes a nozzle head housing having a nozzle inlet channel extending into the nozzle head housing, and the nozzle head housing having a nozzle extension member mounted thereon. The nozzle extension member has a nozzle outlet channel formed therein which is connected to the nozzle inlet channel for receiving sealant material from the nozzle inlet channel. The nozzle head housing further includes an interior chamber formed in the nozzle extension member which has a nozzle outlet opening, the interior chamber being connected to the nozzle outlet channel for receiving sealant material therefrom. The nozzle outlet opening applies sealant material to fill the space defined by the U-shaped receiving channel between the two panes of glass and the spacer frame.

35 Claims, 7 Drawing Sheets

NON-CONTACT EXTRUSION NOZZLE HEAD FOR APPLYING SEALANT MATERIAL IN AN INSULATED GLASS ASSEMBLY

FIELD OF THE INVENTION

The invention relates to a non-contact extrusion nozzle head that applies a sealant material evenly around the perimeter of an insulated glass assembly consisting of two panes of glass separated by a spacer. More particularly, the nozzle head is used as a guide for applying the sealant material between the two layers of glass panes to provide a smooth finished surface of sealant material.

BACKGROUND OF THE INVENTION

Several types of dispensing nozzles for applying sealant material between two layers of glass panes have been utilized in the past. Generally, these standard types of dispensing nozzles have a sealant extruder system with a heating element thereon which applies the sealant material into a channel between the two layers of glass sheets. The sealant material is forced through the nozzle head by a pressure-applying member from a sealant material supply.

The manufacturing of an insulated glass frame includes the assembly of two sheets or panels of glass separated by one or more spacers so that there is a layer of insulating air between the two panels of glass. To seal in the insulating layer of air, a sealant material must be applied to each edge of the glass panels in the space formed between the spacer and the edges of the glass panels. In order to form a good seal, the two glass panels must be accurately aligned relative to each other, and, in addition, the spacer along each edge of the glass assembly must be properly spaced and aligned relative to the two glass panels. As a still further condition for forming a good seal, the glass assembly and spacers must be maintained in proper alignment while the sealant material is being applied thereto. Finally, the sealant material must be applied in such a way that it is uniform and covers the entire edge of the glass assembly.

The application of adhesive or other sealant material to substrates is well known and is particularly well known in the production of an insulated glass assembly. In the manufacturing of insulated glass, it is important to insure that the perimeter of a unit is completely sealed. If this is not done, the result is the ingress of moisture or debris which eventually leads to the premature degradation of an insulated glass assembly.

In view of this difficulty, the prior art has proposed various nozzles and applying apparatus to insure uniform application of sealant material in the glass assemblies. Typical of the known nozzle arrangements are extrusion heads which are either automated or manual. One of the primary difficulties of the known arrangements is that the sealant material is not uniformly applied in width or depth about the entire perimeter. Further, these known arrangements are limited in that they do not positively avoid entrapment of air within the sealant material. A further limitation is that the outer surface of the sealant material is not smooth and perfectly perpendicular relative to the substrate surface. The result of this is surface irregularity about the perimeter as opposed to a smooth planar finish which is more desirable from an aesthetic point of view as well as a structural point of view.

Although nozzle designs and applying apparatus have been developed in the past for handling insulated glass assemblies and applying sealant material to the edges, such apparatus has not been totally satisfactory. In one prior art system, a stationary header applies the sealant material to the glass assembly as it moves along a work support. However, one of the problems of such an arrangement is that it is difficult to keep the glass assembly and spacers properly aligned, relative to each other, as it moves relative to the stationary header. As a result, defects in the seal are likely to occur.

In another prior art arrangement, the sealant material is applied to a frame formed by aluminum spacers, and then the spacer frame with the sealant material applied thereto is taken to another station where the glass panels are adhered to the spacer frame. The glass assembly is then transferred to a vertically arranged heating and compression station to heat and compress the assembly. As will be understood, such an arrangement is time consuming, expensive, requires many work stations and is not automatic. Accordingly, this system has also not been entirely satisfactory.

Other problems of prior art sealant applying apparatus is that they have elaborate and expensive motion systems for changing the alignment of the dispensing nozzle head when applying sealant material to different sizes (or width) of air spaces between two glass panes.

Still other problems of present sealant applying apparatus is the use of complex, elaborate and expensive space feedback sensors or space feedback mechanisms for allowing differences between the sealant space caused by improper positioning of the spacer component between the two layers of glass panes of the insulated glass assembly.

Further problems occur with frequent wearing out of the dispensing nozzle heads presently used in the aforementioned prior art sealant applying apparatus. As these dispensing nozzle heads are in contact with the glass panes, they are quickly abraded by the glass pane units, such that the nozzle heads must be changed on a weekly basis. This decreases the production of insulated glass assemblies being manufactured.

In view of the existing limitations in the sealant applying art, there exists a need for an improved nozzle for applying sealant between insulated glass panels to produce a properly sealed insulated glass assembly.

DESCRIPTION OF THE PRIOR ART

Dispensing nozzles for sealant materials of various designs, configurations, styles and materials of construction have been disclosed in the prior art. For example, U.S. Pat. No. 3,852,149 to SITTER et al discloses an apparatus for manufacturing sealed glass window assemblies having a sealant extruder with a heating element thereon which applies sealant material into the channel. The sealant material is forced through a nozzle head via a screw member wherein the nozzle head has two oppositely inclined openings which serve to direct the heated sealant material into the corners of the channel between the two layers of glass sheets. This prior art patent does not disclose or teach the particular structure, design, configuration or function of the present invention of a non-contact extrusion nozzle head for applying sealant material in an insulated glass assembly.

U.S. Pat. Nos. 3,876,489 and 4,120,999 to CHENEL disclose an apparatus for the manufacture of multi-pane windows having an extrusion assembly. The extrusion assembly (or extrusion station) includes a plurality of sealant containers, extruders and a nozzle head. These prior art patents do not disclose or teach the particular structure, design, configuration or function of the present invention of a non-contact extrusion nozzle head for applying sealant material in an insulated glass assembly.

U.S. Pat. Nos. 4,088,522 and 4,145,237 to MERCIER et al disclose an apparatus for simultaneously sealing two edges of a multiple pane window by applying sealant material via nozzle heads. The nozzle heads are of a simple design and each has an extrusion nozzle member, respectively, for applying sealant material between two glass panes for forming a seal. These prior art patents do not disclose or teach the particular structure, design, configuration or function of the present invention of a non-contact extrusion nozzle head for applying sealant material in an insulated glass assembly.

U.S. Pat. No. 5,268,049 to MARRIOTT discloses a method of laminating glass sheets together using a nozzle and sleeve assembly of a simple design in order to introduce a measured volume of a liquid laminating resin between the glass sheets so that the resin contacts the inner surfaces of glass sheets, respectively. This prior art patent does not disclose or teach the particular structure, design, configuration or function of the present invention of a non-contact extrusion nozzle head for applying sealant material in an insulated glass assembly.

None of the prior art patents disclose or teach the structure, configuration and design of the non-contact extrusion nozzle head of the present invention for applying sealant material uniformly in the space formed by a pair of glass panes and a spacer for forming an insulated glass assembly.

Accordingly, it is an object of the present invention to provide a non-contact extrusion nozzle head that applies the sealant material evenly around the perimeter of an insulated glass assembly consisting of two panes of glass separated by a spacer.

Another object of the present invention is to provide a non-contact extrusion nozzle head such that the sealant material is applied to the inner walls of the glass panes and onto the inner walls of the spacer without the sealant material spilling over or getting on the outside surfaces of the two glass panes of the insulated glass assembly while being made.

Another object of the present invention is to provide at least one or more non-contact extrusion nozzle heads such that one of the dispensing nozzle heads moves along three (3) sides of the insulated glass assembly in order for the extrusion nozzle head to apply the sealant material, and the other dispensing nozzle head moves along the fourth side of the insulated glass assembly to apply the sealant material thereto.

Another object of the present invention is to provide non-contact extrusion nozzle heads that are designed to change the alignment of the applying apparatus for different sizes of air spaces in order to eliminate the need for elaborate motion detector systems.

Another object of the present invention is to provide non-contact extrusion nozzle heads that are designed to allow for differences in the sealant space caused by improper positioning of the spacer, such that there is no need for the use of space feedback sensors or space feedback mechanisms in the applying apparatus.

Another object of the present invention is to provide non-contact extrusion nozzle heads which allows for faster sealing of the insulated glass assembly as three sides of the glass pane unit and the fourth side of the glass pane unit are sealed simultaneously via two dispensing nozzle heads.

Another object of the present invention is to provide non-contact extrusion nozzle heads that wear out at an extremely slow rate because of no abrasion, thereby increasing the production of insulated glass assemblies, lowering the labor and maintenance parts costs, and reducing the number of shut-downs for equipment failure.

A further object of the present invention is to provide a non-contact extrusion nozzle head that can be mass produced in an automated and economical manner and is readily affordable by the manufacturer.

SUMMARY OF THE INVENTION

The present invention provides a non-contact extrusion nozzle head for applying sealant material to a U-shaped receiving channel defined by two panes of glass and a spacer frame for forming an insulated glass assembly. The non-contact extrusion nozzle head includes a nozzle head housing having a nozzle inlet channel extending into the nozzle head housing, and the nozzle head housing having a nozzle extension member mounted thereon. The nozzle extension member has a nozzle outlet channel formed therein which is connected to the nozzle inlet channel for receiving sealant material from the nozzle inlet channel. The nozzle head housing further includes an interior chamber formed in the nozzle extension member which has a nozzle outlet opening, the interior chamber being connected to the nozzle outlet channel for receiving sealant material therefrom. The nozzle outlet opening applies sealant material to fill the space defined by the U-shaped receiving channel between the two panes of glass and the spacer frame.

BRIEF DESCRIPTION OF THE DRAWINGS

Further objects, features, and advantages of the present invention will become apparent upon the consideration of the following detailed description of the presently-preferred embodiment when taken in conjunction with the accompanying drawings, wherein.

DETAILED DESCRIPTION OF THE PREFERRED AND ALTERNATE EMBODIMENTS

OVERVIEW

Figure 5:
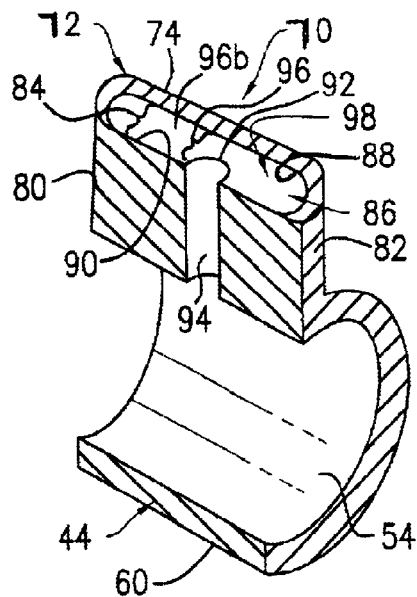
FIG. 5 is an enlarged cross-sectional perspective view of the non-contact extrusion nozzle head of the non-contact extrusion nozzle head of the preferred embodiment of the present invention taken along lines 5—5 of FIG. 4 showing the nozzle extension member having a nozzle extension outlet opening with an interior chamber therein.
Figure 6:
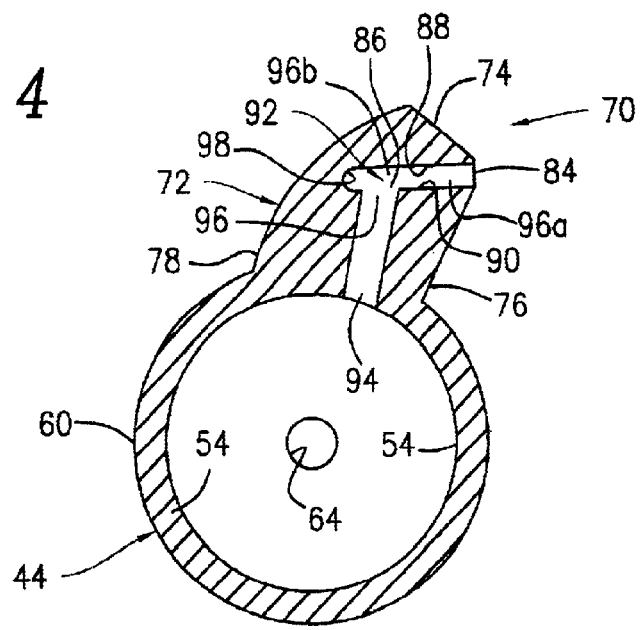
FIG. 6 is an enlarged cross-sectional elevational view of the non-contact extrusion nozzle head of the preferred embodiment of the present invention taken along lines 6—6 of FIG. 4 showing the nozzle extension member having a nozzle extension outlet opening, an interior chamber, a chamber outlet hole opening, and a nozzle outlet cylindrical channel connecting the interior chamber to that of the nozzle inlet cylindrical channel for transferring sealant material therethrough.
Figure 7:
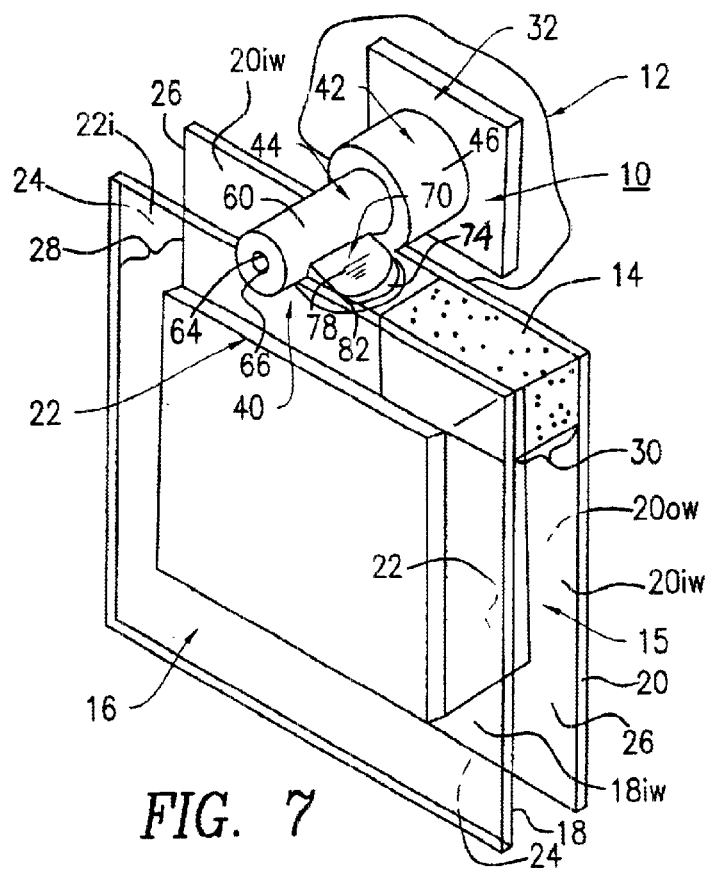
FIG. 7 is a front perspective view of the non-contact extrusion nozzle head of the preferred embodiment of the present invention showing the dispensing nozzle head applying sealant material between the inner walls of the two glass panes and onto the inner wall of the spacer of an insulated glass assembly being in an operational mode.
Figure 12:
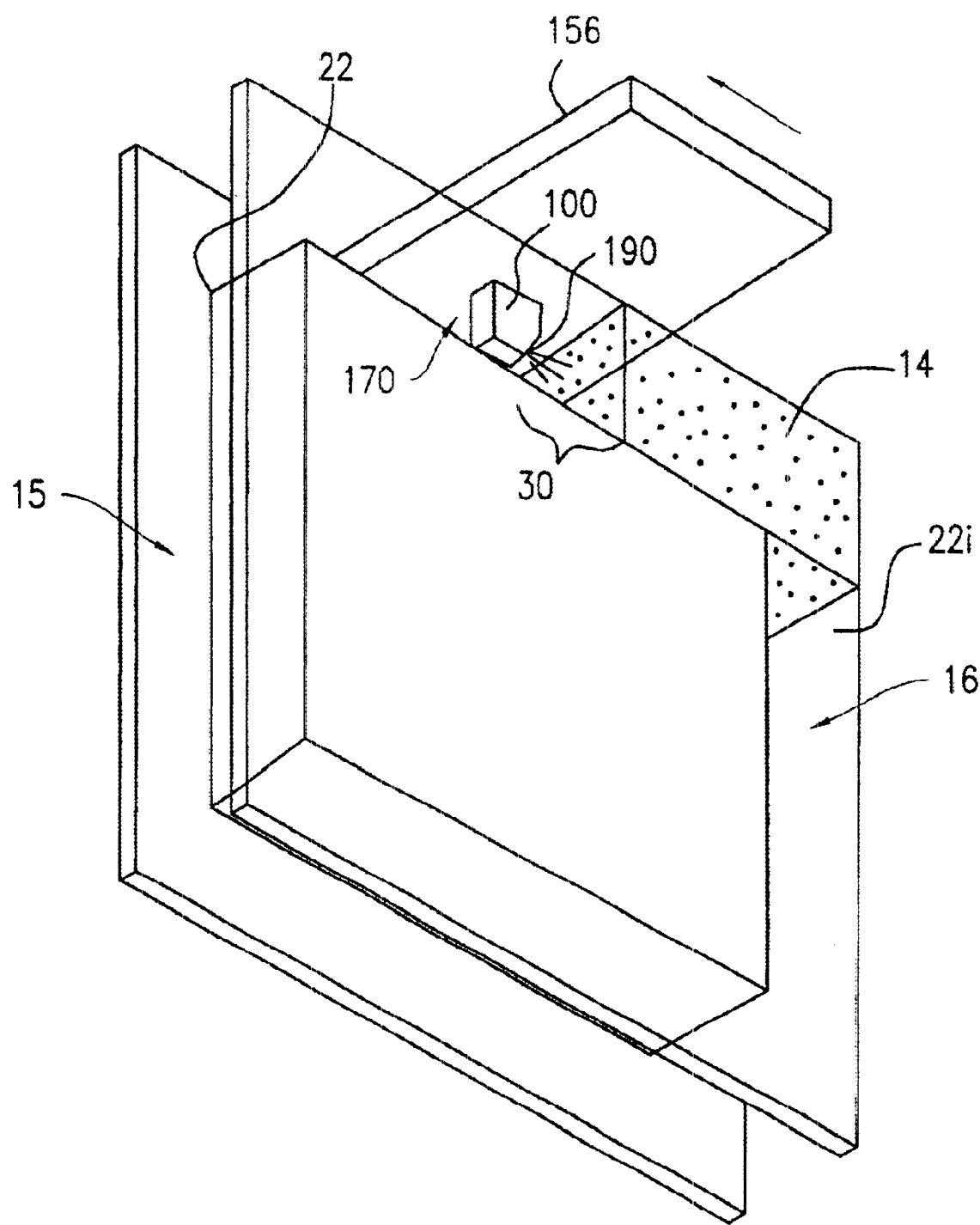
FIG. 12 is a front perspective view of the non-contact extrusion nozzle head of the alternate embodiment of the present invention showing the dispensing nozzle head applying sealant material between the inner walls of the two glass panes and onto the inner wall of the spacer of an insulated glass assembly being in an operational mode.

The non-contact extrusion nozzle heads of the preferred embodiment 10 and the alternate embodiment 100 are represented in detail by FIGS. 1 to 10 of the drawings. The non-contact extrusion nozzle heads 10 and 100 of the preferred and alternate embodiments, as shown in FIGS. 7 and 12 of the drawings, respectively, are used in conjunction with a sealant applying apparatus 12 that applies sealant material 14 to an insulated glass assembly 16. The dispensing nozzle heads 10 or 100 extrude sealant material 14 into a U-shaped receiving channel 15 defined by the two layers of glass panes (sheets) 18 and 20 and the spacer frame 22. The sealant material 14 is applied to the inner surface walls 18iw and 20iw of the glass panes 18 and 20, respectively, and onto the inner surface wall 22i of the spacer frame 22 without the sealant material 14 spilling over or getting on the outer surface walls 18ow and 20ow of the two glass panes 18 and 20 of the insulated glass assembly 16. In all respects the non-contact extrusion nozzle heads 10 and 100 of the preferred and alternate embodiments function and operate in a similar manner except for the size, shape and configuration of the nozzle head housings 40 and 140, respectively. The sealant applying apparatus 12 for moving the non-contact extrusion nozzle heads 10 and 100 of this present invention is described more fully in copending U.S. patent application Ser. No. 09/873,692 now U.S. Pat. No. 6,554,043.

The non-contact extrusion nozzle heads 10 or 100 may be made of durable plastic compositions or metals or metal alloys. Nozzle heads 10 or 100 made of durable plastic compositions are selected from the group consisting of nylon, nylatron G, nylon 6/6 with PTFE and silicone, polyethylene, polypropylene, polystyrene, polyurethane, polyamides, Teflon™, Hydex™, acetal, acetal with polytetrafluorethylene (PTFE) and silicone; polyester elastomer with PTFE and silicone; polyvinyl butyryl modified phenolic resin matrix composites with the use of E-glass and/or Kevlar-49™ reinforcing fabric materials contained therein; and equivalents thereof. Nozzle heads 10 or 100 made of durable metals and metal alloys are selected from the group consisting of brass, stainless steels, steel, aluminum, nickel, titanium, tungsten and equivalents thereof.

The nozzle heads 10 or 100 are designed to change the alignment of the applying apparatus 12 for different sizes of air spaces 28, as well as, to allow for differences in the sealant space 30 caused by improper positioning the spacer frame 22 in the production of the insulated glass assembly 16, as depicted in FIGS. 7 and 12 of the drawings.

Preferred Embodiment 10

The non-contact extrusion nozzle head 10 and its component parts of the preferred embodiment of the present invention are represented in detail by FIGS. 1 through 7 and 12 of the drawings. As shown in FIGS. 7 and 12 of the drawings, the non-contact extrusion nozzle head 10 in conjunction with the sealant applying apparatus 12 applies a sealant material 14 evenly around the interior (inner) perimeter edges 24 and 26 of an insulated glass assembly 16 consisting of a U-shaped receiving channel 15 being defined by glass panes 18 and 20, respectively, separated by a spacer frame 22.

Figure 1:
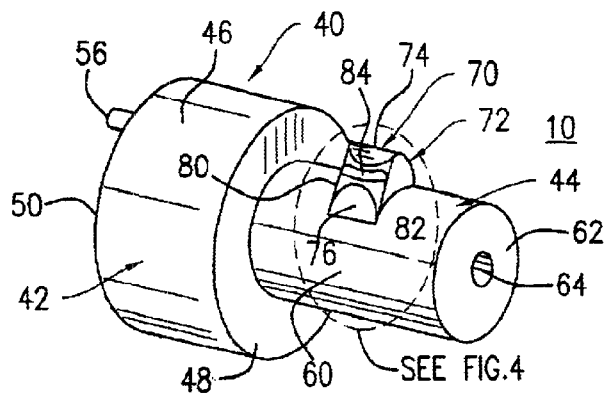
FIG. 1 is a front perspective view of the non-contact extrusion nozzle head of the preferred embodiment of the present invention showing the component parts thereof.
Figure 2:
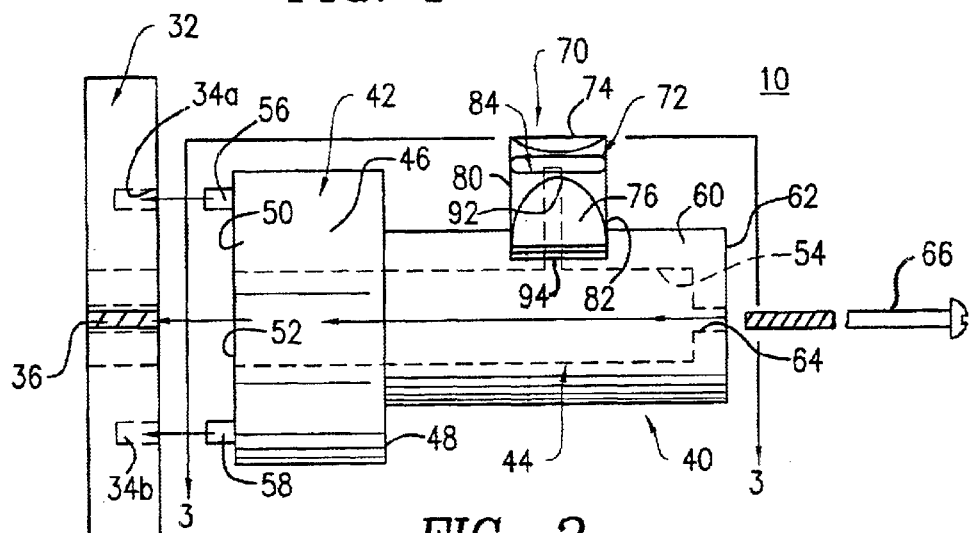
FIG. 2 is a side elevational view of the non-contact extrusion nozzle head of the preferred embodiment of the present invention showing the component parts of the nozzle head thereof, the nozzle holding plate, and the mounting bolt.
Figure 3:
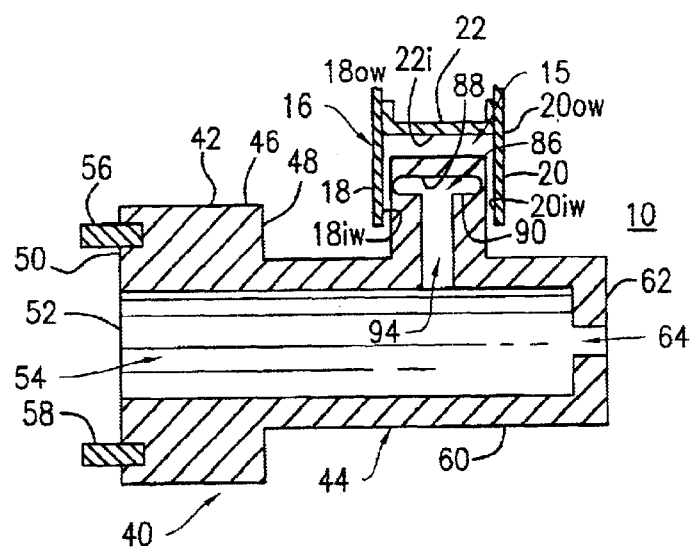
FIG. 3 is a cross-sectional view of the non-contact extrusion nozzle head of the preferred embodiment of the present invention taken along lines 3—3 of FIG. 2 showing the component parts thereof.

The non-contact extrusion nozzle head 10, as shown in FIGS. 1 through 3, includes a nozzle head housing 40 having a first cylindrical section 42 and an integrally attached smaller second cylindrical section 44. First cylindrical section 42 includes an outer circular surface wall 46, a top perimeter surface-wall 48 and a bottom surface wall 50. Bottom surface wall 50 includes a nozzle inlet opening 52 having a nozzle inlet cylindrical channel 54 extending through the first and second cylindrical sections 42 and 44, respectively. Bottom surface wall 50 also includes a pair of integrally attached locating pins 56 and 58 being 180° degrees opposed to each other. As shown in FIG. 2, locating pins 56 and 58 are received within locating pin openings 34a and 34b on nozzle holding plate 32, respectively. Nozzle holding plate 32 is connected to the automatic valving component 13 of the sealant applying apparatus 12, such that the locating pins 56 and 58 align the dispensing nozzle head 10 in a pre-determined position, wherein the nozzle extension outlet opening 84 is disposed and extends into the U-shaped receiving channel 15 between the two layers of glass panes 18 and 20 for the extruding of the sealant material 14 therein.

Figure 4:
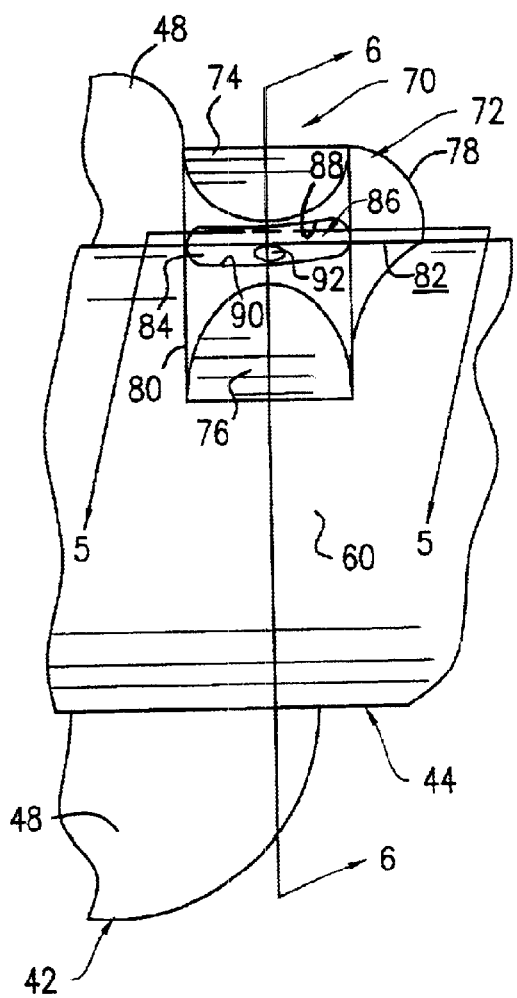
FIG. 4 is an enlarged perspective view of the non-contact extrusion nozzle head of the preferred embodiment of the present invention showing the nozzle extension member and its component parts thereof.

Second cylindrical section 44 includes an outer circular surface wall 60 and a top surface wall 62 having a mounting hole opening 64 for receiving a mounting bolt/screw 66 therein in order to affix and connect the dispensing nozzle head 10 via bolt 66 to mounting plate opening 36 of nozzle holding plate 32. Second cylindrical section 44 further includes a centrally located and integrally attached nozzle extension member 70 being positioned on the outer circular surface wall 60. Nozzle extension member 70 includes a substantially rectangular shaped body 72 having a top wall 74, a slanted front wall 76, a slanted rear wall 78 and side walls 80 and 82. As shown in FIGS. 4, 5 and 6, slanted front wall 76, includes a substantially rectangular nozzle extension outlet opening 84 having an interior chamber 86 with top and bottom chamber walls 88 and 90, respectively. Bottom chamber wall 90 includes a chamber outlet hole opening 92 having a nozzle outlet cylindrical channel 94 for connecting the interior chamber 86 to that of the nozzle inlet cylindrical channel 54 in order to transfer the sealant material 14 therethrough. The nozzle outlet cylindrical channel 94 is connected to an intermediate section 96 of the interior chamber 86 thereby forming a recess 98 at one end 96b of the interior chamber 86 remote from the nozzle outlet opening 84 at the other end 96a of the interior chamber 86. The recess 98 is used for receiving and storing of the sealant material before it is extruded from the nozzle head 10.

Alternate Embodiment 100

Figure 13:
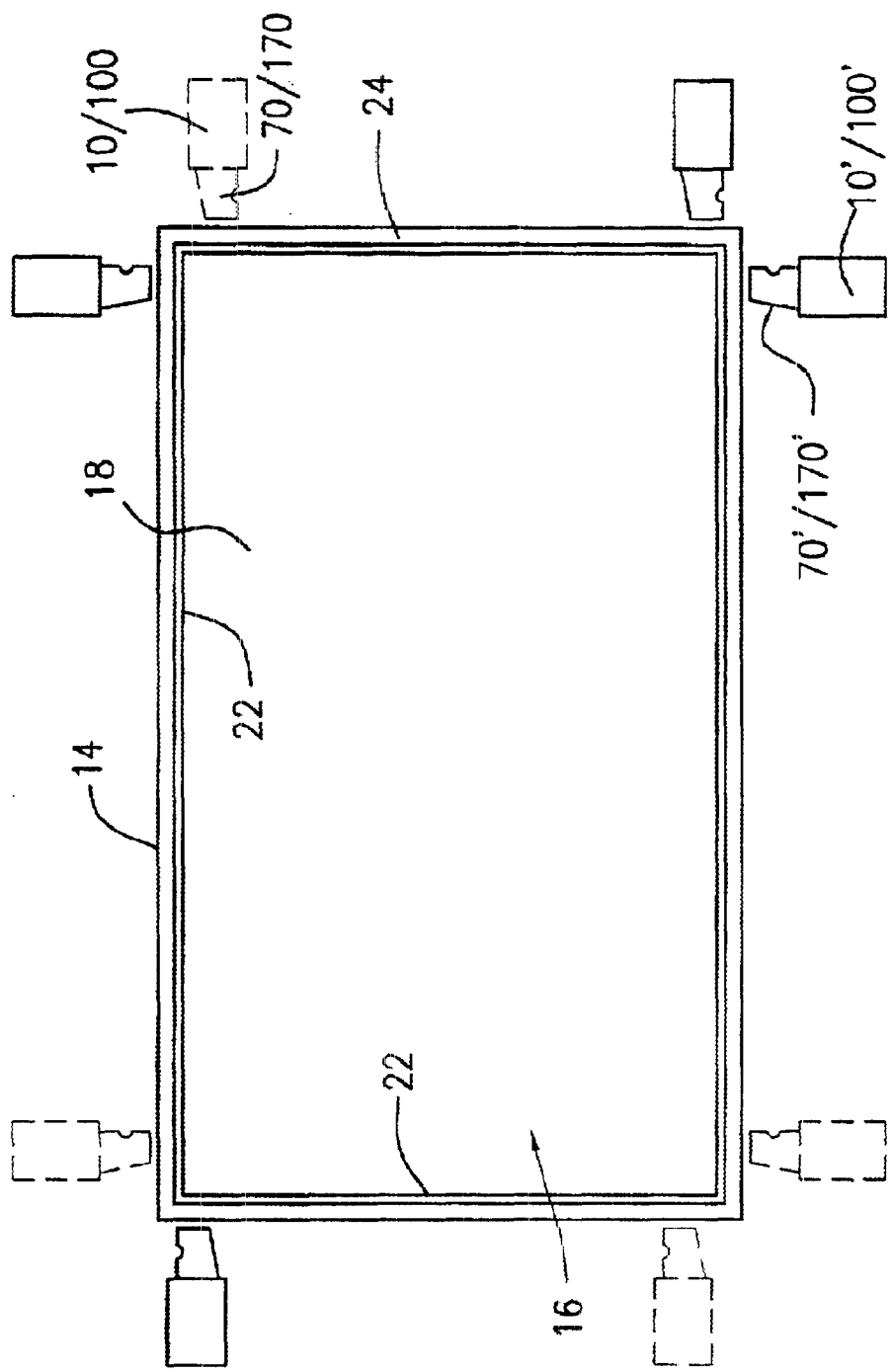
FIG. 13 is a schematic diagram of the non-contact nozzle heads of the present invention showing the dispensing nozzle heads in conjunction with the sealant applying apparatus extruding sealant material to an insulated glass assembly.

The non-contact extrusion nozzle head 100 and its component parts of the alternate embodiment of the present invention are represented in detail by FIGS. 8 through 13 of the drawings. As shown in FIGS. 12 and 13 of the drawings, the non-contact extrusion nozzle head 100 in conjunction with the sealant applying apparatus 12 applies a sealant material 14 evenly around the inner perimeter edges 24 and 26 of an insulated glass assembly 16 consisting of a U-shaped receiving channel 15 being defined by two panes of glass 18 and 20, respectively, separated by a spacer frame 22.

Figure 8:
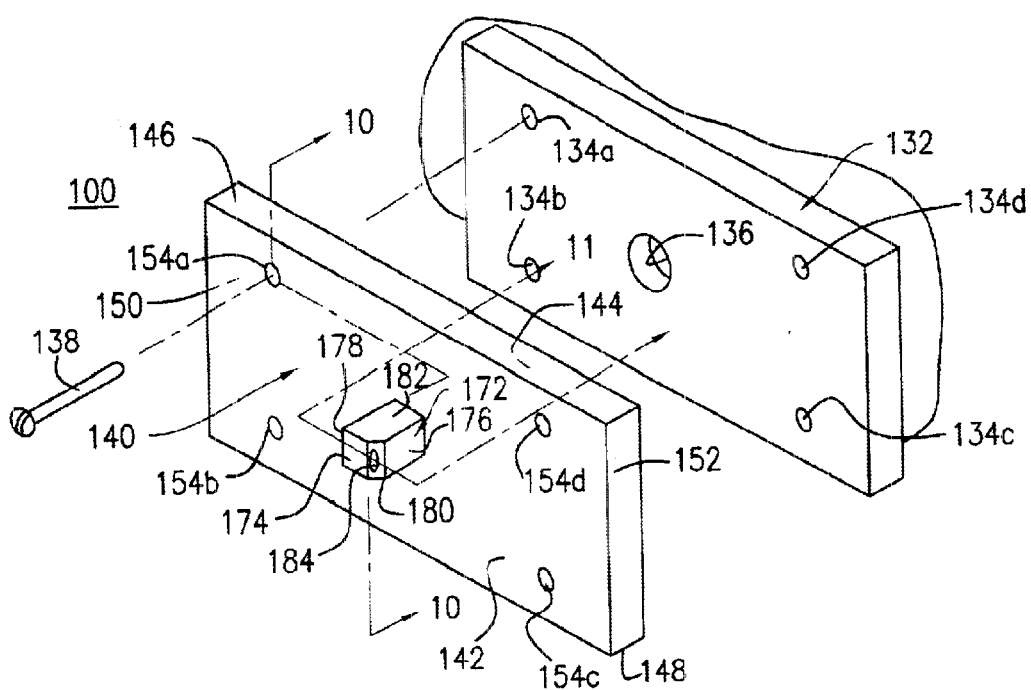
FIG. 8 is a front perspective view of the non-contact extrusion nozzle head of the alternate embodiment of the present invention showing the nozzle head housing and its components parts thereof, and the nozzle holding plate.
Figure 9:
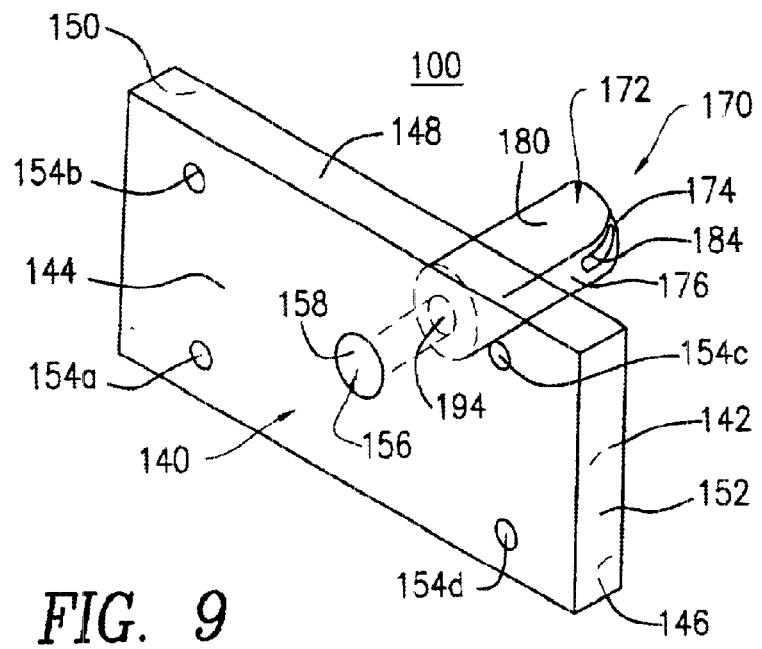
FIG. 9 is a rear perspective view of the non-contact extrusion nozzle head of the alternate embodiment of the present invention showing the component parts thereof.

The non-contact extrusion nozzle head 100, as shown in FIGS. 8 and 9, includes a nozzle head housing 140 being substantially a rectangular shape. Nozzle head housing 140 includes a front surface wall 142, a rear surface wall 144, a top surface wall 146, a bottom surface 148 and side surface walls 150 and 152. Nozzle head housing 140 also includes a plurality of mounting hole openings 154a to 154d extending through the front and rear surface walls 142 and 144. Mounting hole openings 154a to 154d are aligned with mounting plate hole openings 134a to 134d, respectively, of nozzle holding plate 132, as shown in FIG. 8. A plurality of machine bolts or machine screws 138 are received within each of the aligned openings 154a and 134a; 154b and 134b; 154c and 134c; and 154d and 134d; respectively, such that the dispensing nozzle head housing 140 is attached to nozzle holding plate 132. This aforementioned attachment of nozzle head housing 140 to nozzle holding plate 132 aligns the dispensing nozzle head 10 in a pre-determined position, wherein the nozzle extension outlet opening 184 is disposed and extends into the U-shaped receiving channel 15 between the two layers of glass panes 18 and 20 for extruding of sealant material 14 therein, as depicted in FIG. 12 of the drawings.

Rear surface wall 144 includes a nozzle inlet opening 156 having a nozzle inlet cylindrical channel 158. Nozzle inlet opening 156 is aligned with plate opening 136 of the nozzle holding plate 132 when nozzle head housing 140 is attached to the nozzle holding plate 132.

Figure 10:
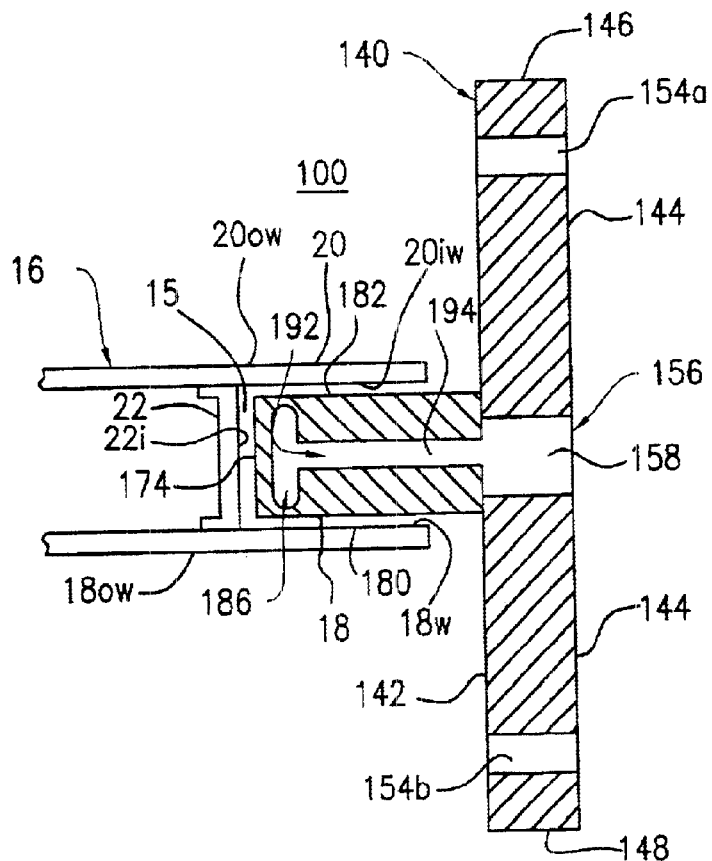
FIG. 10 is a cross-sectional view of the non-contact extrusion nozzle head of the alternate embodiment of the present invention taken along lines 10—10 of FIG. 8 showing the nozzle extension member and its component parts thereof.
Figure 11:
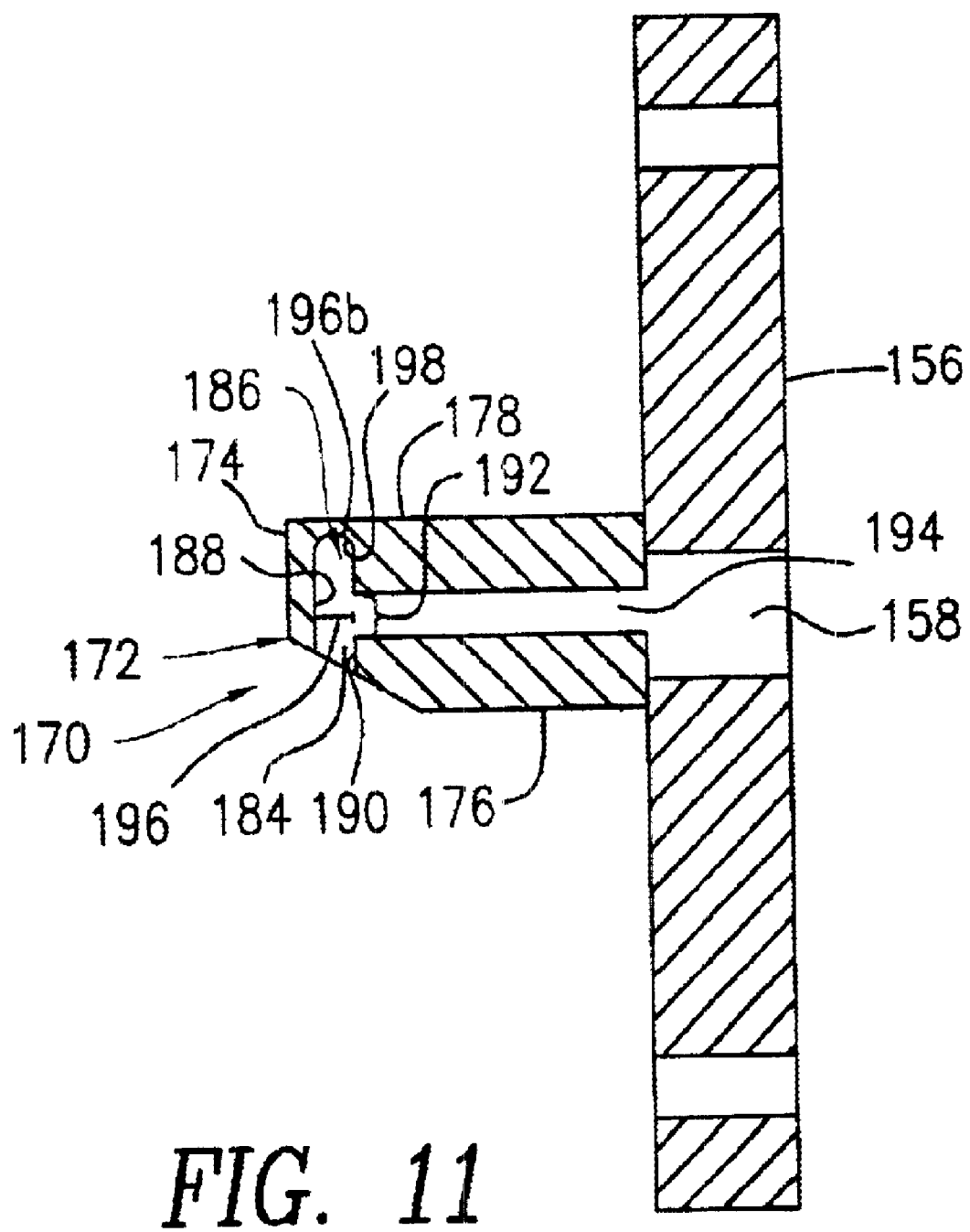
FIG. 11 is a cross-sectional view of the non-contact extrusion nozzle head of the alternate embodiment of the present invention taken along lines 11—11 of FIG. 8 showing the nozzle extension member having a nozzle extension outlet opening, an interior chamber, a chamber outlet hole opening, and a nozzle outlet cylindrical channel connecting the interior chamber to that of the nozzle inlet cylindrical channel for transferring sealant material therethrough.

Front surface wall 142 includes a centrally located and integrally attached nozzle extension member 170. Nozzle extension member 170 includes a substantially rectangular shaped body 172 having a top wall 174, a slanted front wall 176, a slanted rear wall 178 and side walls 180 and 182. As shown in FIGS. 10 and 11, slanted front wall 176 includes a substantially rectangular nozzle extension outlet opening 184 having an interior chamber 186 with top and bottom chamber walls 188 and 190, respectively. Bottom chamber wall 190 includes a chamber outlet hole opening 192 having a nozzle outlet cylindrical channel 194 for connecting the interior chamber 186 of the nozzle inlet cylindrical channel 154 in order to transfer the sealant material 14 therethrough. The nozzle outlet cylindrical channel 194 is connected to an intermediate section 196 of the interior chamber 186 thereby forming a recess 198 at one end 196b of the interior chamber 186 remote from the nozzle outlet opening 184 at the other end 196a of the interior chamber 186. The recess 198 is used for receiving and storing of sealant material before it is extruded from the nozzle head 100.

OPERATION OF THE PRESENT INVENTION

In using either the preferred or alternate embodiments of the present invention of the non-contact extrusion nozzle heads 10 or 100 in conjunction with the sealant applying apparatus 12, the operator has to mount the dispensing nozzle heads 10 or 100 to nozzle holding plates 32 or 132, respectively, as shown in FIGS. 2 and 8 of the drawings. In mounting the dispensing nozzle heads 10 or 100 to the nozzle holding plates 32 or 132, as previously described in the detailed description section of the application, the operator checks the alignment of each dispensing nozzle head 10 or 100, such that the nozzle extension members 70 or 170 of each dispensing nozzle head 10 or 100 is precisely centered within the U-shaped receiving channel 15 in a non-contact manner between the two layers of glass panes 18 and 20 and the spacer frame 22, as shown in FIGS. 3 and 10 of the drawings, of the insulated glass assembly 16. Once each of the dispensing nozzle heads 10, 10', 100 and 100' are properly positioned and aligned, the extrusion of sealant material 14 can start.

As shown in FIG. 13 of the drawings, the mounted non-contact extrusion nozzle heads 10 or 100 and 10' or 100' are ready to start and are positioned at corner A of the insulated glass assembly 16. The operator then starts motorized valving component 13 of the sealant applying apparatus 12, so that the dispensing nozzle head 10 or 100 proceeds to move along side 1 of the insulated glass assembly 16 such that the sealant material 14 is extruded into the U-shaped receiving channel 15 between the two panes of glass 18 and 20 and the spacer frame 22. The sealant material 14 is extruded from nozzle extension outlet opening 84 or 184 of nozzle extension member 70 or 170 where nozzle extension outlet opening 84 or 184 is extended precisely between the two layers of glass panes 18 and 20, as shown in FIGS. 3 and 10 of the drawings, such that the sealant material 14 is received within the. U-shaped receiving channel 15 of side 1.

The next operational step has dispensing nozzle head 10 or 100 at corner B, and dispensing nozzle head 10' or 100' at corner A. They simultaneously move along sides 2 and 4 via the motorized valving components 13 and 13', so that sealant material 14 is simultaneously extruded from each of the nozzle extension outlet openings 84 or 184, and 841 or 184' of nozzle extension members 70 or 170, and 70' or 170', respectively. The sealant material 14 is received within the U-shaped receiving channel 15 of sides 2 and 4, respectively, and the dispensing nozzle heads 10 or 100 and 10' or 100' are at rest at corners C and D of sides 2 and 4, respectively.

The last operational step has the motorized valving component 13 of the sealant applying apparatus 12 starts at corner C, where the dispensing nozzle head 10 or 100 proceeds to move along side 3 of the insulated glass assembly 16 such that the sealant material 14 is extruded into the U-shaped receiving channel 15 between the two panes of glass 18 and 20 and the spacer frame 22. The sealant material 14 is extruded from nozzle extension outlet opening 84 or 184 of nozzle extension member 70 or 170 where nozzle extension outlet opening 84 or 184 extends precisely between the two layers of glass panes 18 and 20, as shown in FIGS. 3 and 10 of the drawings, such that the sealant material 14 is received within the U-shaped receiving channel 15 of side 4. Dispensing nozzle head 10 or 100 is then at rest at corner D of side 4, as shown in FIG. 13 of the drawings.

ADVANTAGES OF THE PRESENT INVENTION

Accordingly, an advantage of the present invention is that it provides a non-contact extrusion nozzle head that applies the sealant material evenly around the perimeter of an insulated glass assembly consisting of two panes of glass separated by a spacer.

Another advantage of the present invention is that it provides for a non-contact extrusion nozzle head such that the sealant material is applied to the inner walls of the glass panes and onto the inner walls of the spacer without the sealant material spilling over or getting on the outside surfaces of the two glass panes of the insulated glass assembly while being made.

Another advantage of the present invention is that it provides for at least one or more non-contact extrusion nozzle heads such that one of the dispensing nozzle heads moves along three (3) sides of the insulated glass assembly in order for the extrusion nozzle head to apply the sealant material, and the other dispensing nozzle head moves along the fourth side of the insulated glass assembly to apply the sealant material thereto.

Another advantage of the present invention is that it provides for non-contact extrusion nozzle heads that are designed to change the alignment of the applying apparatus for different sizes of air spaces in order to eliminate the need for elaborate motion detector systems.

Another advantage of the present invention is that its provide for non-contact extrusion nozzle heads that are designed to allow for differences in the sealant space caused by improper positioning of the spacer, such that there is no need for the use of space feedback sensors or space feedback mechanisms in the applying apparatus.

Another advantage of the present invention is that it provides for non-contact extrusion nozzle heads which allows for faster sealing of the insulated glass assembly as three sides of the glass pane unit and the fourth side of the glass pane unit are sealed simultaneously via two dispensing nozzle heads.

Another advantage of the present invention is that it provides for non-contact extrusion nozzle heads that wear out at an extremely slow rate because of no abrasion, thereby increasing the production of insulated glass assemblies, lowering the labor and maintenance parts costs, and reducing the number of shut-downs for equipment failure.

A further advantage of the present invention is that it provides for a non-contact extrusion nozzle head that can be mass produced in an automated and economical manner and is readily affordable by the manufacturer.

A latitude of modification, change, and substitution is intended in the forgoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A non-contact extrusion nozzle head for applying sealant material to a U-shaped receiving channel defined by two panes of glass and a spacer frame for forming an insulated glass assembly, comprising:
    a) a nozzle head housing having a nozzle inlet channel extending into said nozzle head housing;
    b) said nozzle head housing having a nozzle extension member mounted thereon;
    c) said nozzle extension member having a nozzle outlet channel formed therein being connected to said nozzle inlet channel for receiving sealant material from said nozzle inlet channel;
    d) an interior chamber formed in said nozzle extension member and having a nozzle outlet opening, said interior chamber being connected to said nozzle outlet channel for receiving sealant material therefrom; said nozzle outlet channel is connected to said interior chamber thereby forming a recess at one end of said interior chamber remote from said opening at the other end of said interior chamber, said recess for receiving and storing the sealant material before it is extruded from said nozzle head; and
    e) said nozzle outlet opening for supplying sealant material to fill the space defined by the U-shaped receiving channel between the two panes of glass and the spacer frame.

2. A non-contact extrusion nozzle head in accordance with claim 1, wherein said nozzle head housing includes a first section connected to a second section.

3. A non-contact extrusion nozzle head in accordance with claim 2, wherein said first section is cylindrical in shape.

4. A non-contact extrusion nozzle head in accordance with claim 2, wherein said first section is cylindrical in shape.

5. A non-contact extrusion nozzle head in accordance with claim 4, wherein said second section has a smaller diameter than said first section.

6. A non-contact extrusion nozzle head in accordance with claim 1, wherein said nozzle head housing further includes means for mounting said nozzle head housing on a holding plate.

7. A non-contact extrusion nozzle head in accordance with claim 6, wherein means for mounting includes a mounting opening for receiving a machine bolt or machine screw therein.

8. A non-contact extrusion nozzle head in accordance with claim 6, wherein said nozzle head housing further includes a pair of locating pins being 180° degrees opposed from each other for being received within locating pin openings of said holding plate.

9. A non-contact extrusion nozzle head in accordance with claim 8, wherein said pair of locating pins align said nozzle head housing in a pre-determined position such that said nozzle outlet opening extends inwardly into said U-shaped receiving channel for extruding the sealant material therein.

10. A non-contact extrusion nozzle head in accordance with claim 1, wherein said nozzle inlet channel is cylindrical in shape.

11. A non-contact extrusion nozzle head in accordance with claim 1, wherein said nozzle outlet channel is cylindrical in shape.

12. A non-contact extrusion nozzle head in accordance with claim 1, wherein said nozzle outlet opening is substantially rectangular in shape having rounded edges.

13. A non-contact extrusion nozzle head in accordance with claim 1, wherein said interior chamber is perpendicular to said nozzle outlet channel.

14. A non-contact extrusion nozzle head in accordance with claim 1, wherein said nozzle extension member includes front and rear tapered walls.

15. A non-contact extrusion nozzle head in accordance with claim 1, wherein said nozzle head housing is made from durable plastic compositions, metals or metal alloys.

16. A non-contact extrusion nozzle head in accordance with claim 15, wherein said durable plastic compositions are selected from the group consisting of nylon, nylatron G, nylon 6/6 with PTFE and silicone, polyethylene, polypropylene, polystyrene, polyurethane, polyamides, polytetrafluoroethylene, polybutylene terephthalate, acetal, acetal with polytetrafluorethylene (PTFE) and silicone; polyester elastomer with PTFE and silicone; polyvinyl butyryl modified phenolic resin matrix composites with the use of E-glass and/or polyparaphenylene terephthalamide reinforcing fabric materials contained therein.

17. A non-contact extrusion nozzle head in accordance with claim 15, wherein said durable metal or metal alloys are selected from the group consisting of brass, stainless steels, steel, aluminum, nickel, titanium and tungsten.

18. A non-contact extrusion nozzle head in accordance with claim 1, wherein said nozzle head includes means for moving the sealant material from the bottom of said interior chamber, through said interior chamber, to the top of said interior chamber.

19. A non-contact extrusion nozzle head for applying sealant material to a U-shaped receiving channel defined by two panes of glass and a spacer frame for forming an insulated glass assembly, comprising:
 a) a nozzle head housing having a first section and a second section, a nozzle inlet channel extending into the first and second sections of said nozzle head housing;
 b) said nozzle head housing having a nozzle extension member mounted on the exterior of said second section;
 c) said nozzle extension member having a nozzle outlet channel formed therein being connected to said nozzle inlet channel for receiving sealant material from said nozzle inlet channel;
 d) said nozzle outlet channel is perpendicular to said nozzle inlet channel;
 e) an interior chamber formed in said nozzle extension member and having a nozzle outlet opening, said interior chamber being connected to said nozzle outlet channel for receiving sealant material therefrom; and
 f) said nozzle outlet opening for supplying sealant material to fill the space defined by the U-shaped receiving channel between the two panes of glass and the spacer frame.

20. A non-contact extrusion nozzle head in accordance with claim 19, wherein said first section is cylindrical in shape.

21. A non-contact extrusion nozzle head in accordance with claim 19, wherein said second section is cylindrical in shape.

22. A non-contact extrusion nozzle head in accordance with claim 21, wherein said second section has a smaller diameter than said first section.

23. A non-contact extrusion nozzle head in accordance with claim 19, wherein said nozzle head housing further includes means for mounting said nozzle head housing on a holding plate.

24. A non-contact extrusion nozzle head in accordance with claim 23, wherein means for mounting includes a mounting opening for receiving a machine bolt or machine screw therein.

25. A non-contact extrusion nozzle head in accordance with claim 23, wherein said nozzle head housing further includes a pair of locating pins being 180° degrees opposed from each other for being received within locating pin openings of said holding plate.

26. A non-contact extrusion nozzle head in accordance with claim 25, wherein said pair of locating pins align said nozzle head housing in a pre-determined position such that said nozzle outlet opening extends inwardly into said U-shaped receiving channel for extruding the sealant material therein.

27. A non-contact extrusion nozzle head in accordance with claim 19, wherein said nozzle inlet channel is cylindrical in shape.

28. A non-contact extrusion nozzle head in accordance with claim 19, wherein said nozzle outlet channel is cylindrical in shape.

29. A non-contact extrusion nozzle head in accordance with claim 19, wherein said nozzle outlet opening is substantially rectangular in shape having rounded edges.

30. A non-contact extrusion nozzle head in accordance with claim 19, wherein said interior chamber is perpendicular to said nozzle outlet channel.

31. A non-contact extrusion nozzle head in accordance with claim 19, wherein said nozzle outlet channel is connected to an intermediate section of said interior chamber thereby forming a recess at one end of said interior chamber remote from said opening at the other end of said interior chamber, said recess for receiving and storing the sealant material before it is extruded from said nozzle head.

32. A non-contact extrusion nozzle head in accordance with claim 31, wherein said nozzle head includes means for moving the sealant material from the bottom of said interior chamber, through said interior chamber, to the top of said interior chamber.

33. A non-contact extrusion nozzle head in accordance with claim 19, wherein said nozzle head housing is made from durable plastic compositions, metals or metal alloys.

34. A non-contact extrusion nozzle head for applying sealant material to a U-shaped receiving channel defined by two panes of glass and a spacer frame for forming an insulated glass assembly, comprising:
 a) a nozzle head housing having a nozzle inlet channel extending into said nozzle head housing;
 b) said nozzle head housing having a nozzle extension member mounted thereon;
 c) said nozzle extension member having a nozzle outlet channel formed therein being connected to said nozzle inlet channel for receiving sealant material from said nozzle inlet channel;
 d) an interior chamber formed in said nozzle extension member and having a nozzle outlet opening, said interior chamber being connected to said nozzle outlet channel for receiving sealant material therefrom;
 e) said interior chamber is perpendicular to said nozzle outlet channel; said nozzle outlet channel is connected to said interior chamber thereby forming a recess at one end of said interior chamber remote from said opening at the other end of said interior chamber, said recess for receiving and storing the sealant material before it is extruded from said nozzle head; and
 f) said nozzle outlet opening for supplying sealant material to fill the space defined by the U-shaped receiving channel between the two panes of glass and the spacer frame.

35. A non-contact extrusion nozzle head for applying sealant material to a U-shaped receiving channel defined by two panes of glass and a spacer frame for forming an insulated glass assembly, comprising:

a) a nozzle head housing having a first section and a second section, a nozzle inlet channel extending into the first and second sections of said nozzle head housing;

b) said nozzle head housing having a nozzle extension member mounted on the exterior of said second section;

c) said nozzle extension member having a nozzle outlet channel formed therein being connected to said nozzle inlet channel for receiving sealant material from said nozzle inlet channel;

d) an interior chamber formed in said nozzle extension member and having a nozzle outlet opening, said interior chamber being connected to said nozzle outlet channel for receiving sealant material therefrom;

e) said interior chamber is perpendicular to said nozzle outlet channel; and f) said nozzle outlet opening for supplying sealant material to fill the space defined by the U-shaped receiving channel between the two panes of glass and the spacer frame.

* * * * *